United States Patent [19]

Gutleber

[11] Patent Number: 4,470,138
[45] Date of Patent: Sep. 4, 1984

[54] NON-ORTHOGONAL MOBILE SUBSCRIBER MULTIPLE ACCESS SYSTEM

[75] Inventor: Frank S. Gutleber, Little Silver, N.J.

[73] Assignee: The United States of America as represented by the Secretary of the Army, Washington, D.C.

[21] Appl. No.: 439,232

[22] Filed: Nov. 4, 1982

[51] Int. Cl.³ ............................................... H04J 6/00
[52] U.S. Cl. ....................................... 370/18; 370/19; 375/96; 375/102
[58] Field of Search ................................... 370/18–22, 370/53, 69.1, 77, 85, 104, 116, 92, 93; 375/1, 25, 34, 38, 96, 102–104; 340/346, 348, 349; 455/206, 260, 284, 302–306; 364/604, 725, 728, 819, 826; 371/37, 39, 40

[56] References Cited

U.S. PATENT DOCUMENTS

| | | | |
|---|---|---|---|
| 3,076,145 | 1/1963 | Copeland et al. | 375/102 X |
| 3,908,088 | 9/1975 | Gutleber | 370/104 |
| 4,163,258 | 7/1979 | Ebihara et al. | 455/303 X |
| 4,215,244 | 7/1980 | Gutleber | 370/116 |
| 4,270,207 | 5/1981 | Gutleber | 375/40 |
| 4,301,530 | 11/1981 | Gutleber | 370/18 |

FOREIGN PATENT DOCUMENTS

147847  11/1980  Japan ................................... 375/102

OTHER PUBLICATIONS

Weik, Martin H., *Communications Standard Dictionary*, Van Nostrand Reinhold Company, 1983, pp. 56, 200.

*Primary Examiner*—Benedict V. Safourek
*Attorney, Agent, or Firm*—Anthony T. Lane; Sheldon Kanars; Jeremiah G. Murray

[57] ABSTRACT

An adaptive interference cancelling system for multibit spread spectrum noise codes wherein a plurality of users in a mobile subscriber access system each operates with a different noise code. Each user receives a composite signal which includes a desired noise coded signal from another user plus any unwanted interference noise coded signals from other like users in relatively close proximity. The RF demodulator or front end section of each user receiver is coupled to a bank of matched filters which selectively detect and identify any interfering codes. These interfering codes are then regenerated devoid of the desired signal to provide a coherent replica of the interference signal. The received composite signal and the coherent replica of one or more interference signals are applied to individual signal subtractor circuits which operate to cancel the interfering noise coded signals leaving the desired signal to be subsequently matched filter detected free of interference from other users.

18 Claims, 3 Drawing Figures

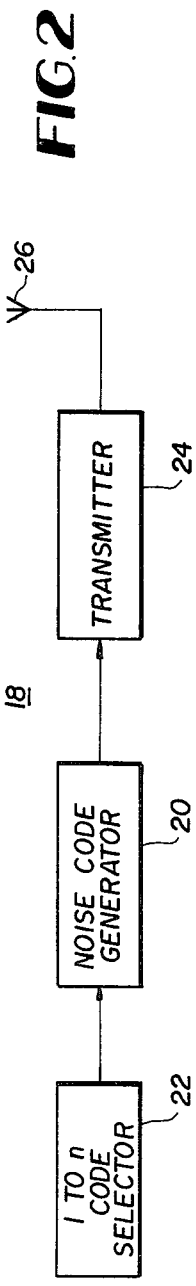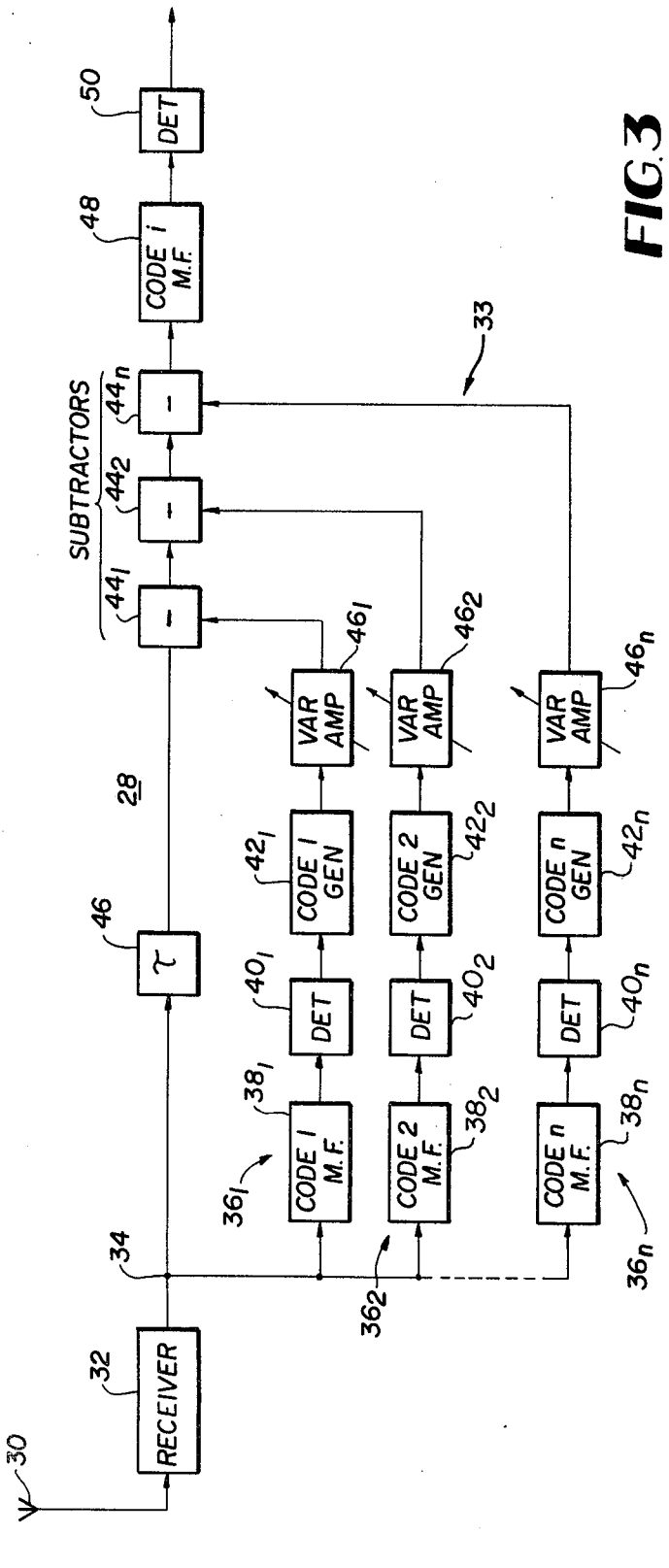

NON-ORTHOGONAL MOBILE SUBSCRIBER MULTIPLE ACCESS SYSTEM

The invention described herein may be manufactured, used and licensed by or for the Government for governmental purposes without the payment to me of any royalties thereon.

FIELD OF THE INVENTION

This invention relates generally to noise code communications systems and more particularly to a non-orthogonal code division multiple access communications system.

BACKGROUND OF THE INVENTION

Multiple access communications systems utilizing noise coded signals are well known. Typical examples of such multiple accessing communications systems are shown and described in: U.S. Pat. No. 3,908,088, entitled, "Time Division Multiple Access Communications System", which issued to Frank S. Gutleber, the present inventor, on Sept. 23, 1975; U.S. Pat. No. 4,215,244, entitled, "Self-Adaptive Mobile Subscriber Access System Employing Time Division Multiple Accessing", which issued to Frank S. Gutleber on July 29, 1980; and U.S. Pat. No. 4,301,530, entitled "Orthogonal Spread Spectrum Time Division Multiple Accessing Mobile Subscriber Access System", which issued to Frank S. Gutleber on Nov. 17, 1981.

What is significant about the systems disclosed in the aforementioned patents is that they employ pairs of multiplexed noise codes of the type termed code mates having autocorrelation functions which upon detection provide an impulse autocorrelation function and wherein the configurations described enable random access or direct call-up to be accomplished with minimal interference between users. The codes utilized are called noise codes because the information to be communicated is coded with a digital code that is "noise like" in that it will compress to an impulse when detected with a matched filter.

The utilization of different noise codes for a plurality of users in a nonsynchronous mobile subscriber multiple access system has been found to be heretofore less than adequate because of self-interference between users. Such a system is referred to as a non-orthogonal system. Although each interference signal is reduced by the time-bandwidth product, interfering users in close proximity make for intolerable system operation.

SUMMARY OF THE INVENTION

Accordingly, it is an object of the present invention to provide an improved non-orthogonal noise code communications system.

Another object of the present invention is to provide a code division multiple access noise code communications system.

Still another object of the present invention is to provide means for cancelling noise coded interference in a nonorthogonal code division multiple access system.

And yet another object of the present invention is to provide a code division multiple access system which enables a large quantity of users to operate in the same confined geographical area without incurring unacceptable mutual interference.

Accordingly, these and other objects are achieved in a code division multiple access communications system including a plurality of users wherein each user employs a different noise code which is modulated on an RF carrier. Each user utilizes radio apparatus which is adapted to generate, transmit, receive and detect multi-bit digital noise codes while operating within the same RF frequency band. The receiver portion of each user apparatus is adapted to receive a desired noise coded signal from another user but additionally includes an adaptive interference cancelling system comprised of a plurality of matched filters coupled to the front end or RF demodulator section which operate to detect and identify any undesired and thus interfering noise codes coming from other close proximity users along with the desired signal. The matched filters are coupled to respective noise code generators which provide a coherent replica of the respective interference code but one devoid of the desired signal. The replica signal is then fed to signal subtractor means along with a composite input received signal which includes both the desired signal and any interference signal. The subtractor circuitry operates to cancel the interference signal(s) leaving the desired noise coded signal to be matched filter detected free of interference.

BRIEF DESCRIPTION OF THE DRAWINGS

FIG. 2 is a functional block diagram of the transmitter portion of apparatus for use with the communications system shown in FIG. 1; and FIG. 3 is a functional block diagram of the receiver portion of apparatus for use with the communications system shown in FIG. 1 and illustrating the preferred embodiment of the subject invention.

DETAILED DESCRIPTION OF THE PREFERRED EMBODIMENT

Figure 1:
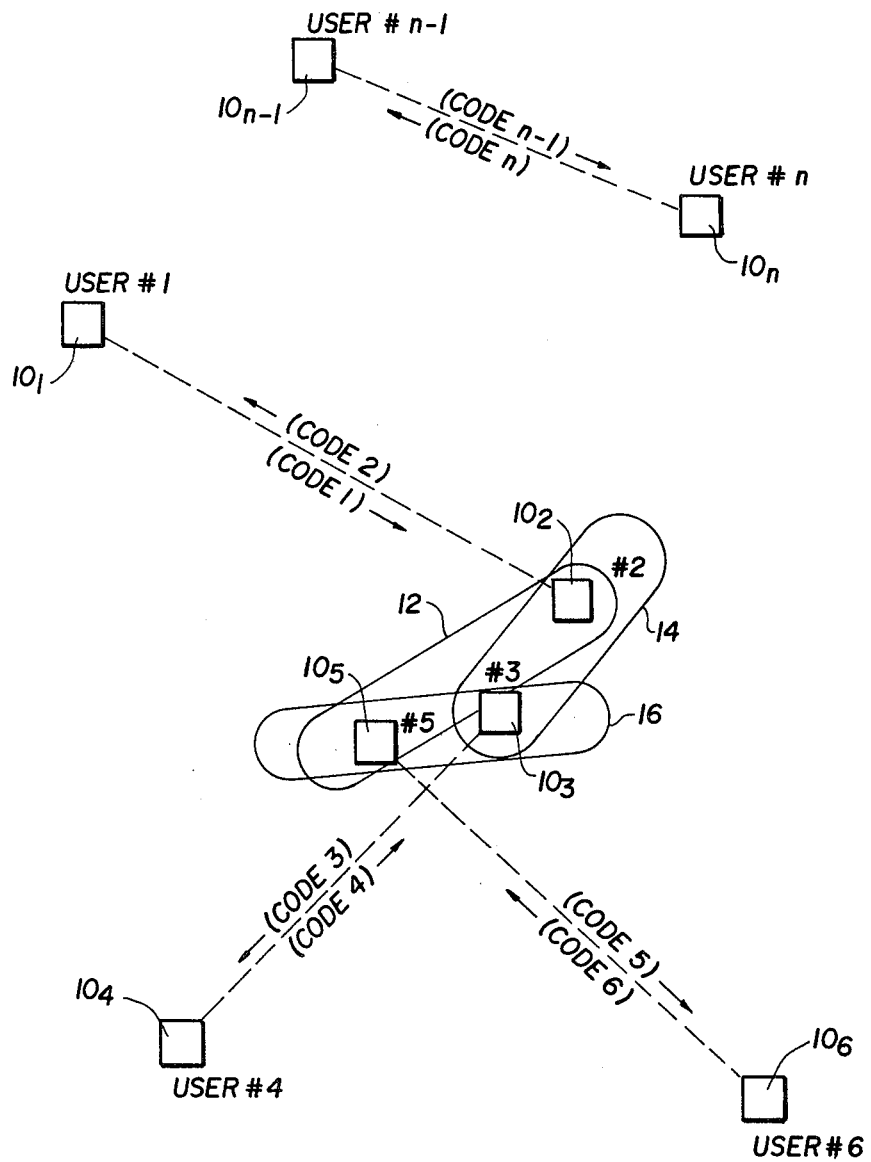
FIG. 1 is a simplified illustration of a non-orthogonal ground mobile access system employing code division multiple accessing.

Referring now to the drawings and more particularly to FIG. 1, there is illustrated a multiple access system such as a mobile subscriber access noise coded communications system employing code division multiple access (CDMA). Each user Nos. 1, 2, ... $n-1$ and $n$ operates with and accordingly generates a different respective multi-bit binary digital noise code $1 \ldots n$ of the same number of bits of the spread spectrum type. Moreover, the codes generated are utilized to modulate RF frequency carriers in the same frequency band and as a consequence self-interference between the various users normally exists for those users which are geographically relatively close to one another. Since the rms value of the crosscorrelation function of different noise codes will be suppressed by the time-bandwidth product, users of the system that are not in close proximity to one another would receive or cause a negligible degree of interference to any other specific user having a receiver responsive to more codes operable in the aforementioned same frequency band. Those users that are in close proximity, however, will interfere with each other since the large increase in the amplitude or level of the interference due to the short range difference between a desired and interfering source of noise code communications signals would overcome the interference suppression associated with the margin of an n bit noise code. As an example, if an interfering user has a 10/1 range advantage, the received signal of the interfering user would be 100 times or 20 db stronger than a desired received signal which is received in a composite signal including the interfering signal. If the system shown in FIG. is implemented with radio apparatus, e.g. transceivers wherein each transceiver employed a 100 bit noise code, then the gain margin advantage of 100/1 or 20 db would be completely nullified and the output signal to interference ratio would be unity or Odb which is totally inadequate.

Further as shown in FIG. 1, in the deployment of user communications apparatus $10_1$, $10_2$, ... $10_n$, user No. 2 communicating with user No. 1 would be interfered with by code 3 from user No. 3 as well as code 5 from user No. 5 in a standard non-orthogonal CDMA system. In a like manner, users 3 and 5 would be interfered with by the code from user No. 2 and codes 3 or 5 as the case may be. The interfering regions are indicated by the loops identified by reference numerals 12, 14 and 16.

The present invention is directed to a CDMA system involving a plurality of user communications apparatus operating with spread spectrum noise codes. The receiver portion of each apparatus includes an adaptive interference cancelling system which is responsive to all the codes of the other users for cancelling undesired close proximity user interference which affects the desired reception from another user.

Referring now to FIG. 2, each user communications apparatus also includes a transmitter portion 18 which in its broadest aspects is comprised of a noise code generator 20 coupled to a 1 through n code selector 22. The noise code selected and generated is fed to transmitter apparatus 24 which is coupled to a radiating antenna 26 which is adapted to radiate a noise code modulated RF signal to another user apparatus which includes a receiver portion 28, the details of which are shown in FIG. 3.

Referring now to FIG. 3, a receiving antenna 30 is coupled to a receiver front end section 32 which is adapted to demodulate the RF signal received from the transmitter 18 from another communicating user and provide an output at circuit node 34 which is a composite noise coded signal including not only the desired signal, but also any other interfering noise coded signals received from other users in close proximity. Adaptive interference cancelling circuitry 33 follows the receiver RF demodulator section 32 and is comprised of a bank i.e. a plurality 1, 2 ... n of like circuits $36_1$, $36_2$ ... $36_n$ which are respectively adapted to detect a mutually different unwanted interfering noise code signal and regenerate it again free of the desired signal. More particularly, each circuit $36_1$, $36_2$, $36_n$ is comprised of a matched filter 38 which is coupled to circuit node 34. Each matched filter 38 is operable to detect a particular noise code of codes 1 through n and establish the precise time of its arrival. Since the codes utilized by the various users 1 ... n are comprised of spread spectrum noise codes, the matched filter 38 will compress the code and provide a high amplitude impulse output in a well known fashion which is fed to a video detector circuit 40 which is adapted to enhance the interfering signal by the time bandwidth product or equivalently the number of noise code bits so that positive detection and identification of strong interference signals is provided. The detected compressed signal from the detector 40 is next fed to a noise code generator 42 which is operable to coherently regenerate the same code structure detected; however, it is totally free of any other interfering code signal as well as the desired signal. The code generated in each of the circuits $36_1$, $36_2$ ... $36_n$ is next fed to one of a plurality of cascaded or tandemly connected signal subtractor circuits $44_1$, $44_2$ ... $44_n$ wherein a particular regenerated noise code is subtracted from a composite signal appearing at circuit node 34. The composite signal appearing at circuit node 34 is coupled to the first signal subtractor $44_1$ shown in FIG. 3 by means of a time delay circuit 46 which provides a time delay of $\tau$ to compensate for the delay introduced when compressing noise coded signals in the appropriate matched filter 38 and regenerating the respective interfering codes in the code generator 42. A variable gain amplifier $46_1$, $46_2$, $46_n$ is furthermore coupled between the noise codes circuits $36_1$, $36_2$ and $36_n$ and their respective subtractor circuits $44_1$, $44_2$ and $44_n$ to set the amplitude of the generated code equal to its respective value at the output of the front end section of the receiver 32.

It can be seen, therefore, that a coherent replica of any unwanted interference code is generated and appropriately fed to one of the subtractor circuits $44_1$, $44_2$ ... $44_n$ which also receives a composite signal consisting of both the desired signal and the interference signal, but due to the subtractive process, the output of the last subtractor circuit $44_n$ comprises a signal free of interference signals which is then fed to a matched filter 48 that is matched to the code structure of the desired signal, which is compressed thereby and fed to a detector 50. The detector 50 provides an output signal that is n times greater than any residual unwanted interference signal that may still exist after subtracting all of the relatively strong interference signals out of the received composite signal appearing at circuit node 34.

While FIG. 3 discloses a bank of matched filters and code generators commonly connected to circuit node 34, it may be desirable to additionally include means, not shown, at the output of the receiver front end section 32 to sequentially search most or all of the codes utilized by the system to provide a correct match for a matched filter.

While the adaptive interference cancelling system shown in FIG. 3 can utilize any class of noise code, the use of multiplexed noise codes such as disclosed in the aforementioned U.S Pat. Nos. 3,908,088; 4,215,244; and 4,301,530 offer substantial advantages in that they not only compress to a lobeless impulse, but the quantity of these unique codes is extremely large for moderate time-bandwidth products. Furthermore, they are relatively easy to generate and compress and the apparatus required is relatively small in size, negligible in weight and low in cost. In an application of multiplexed codes involving relatively strong multipath interference signals, each interfering signal will be isolated when the composite signal is detected in the matched filter since the codes compress to a lobeless impulse when linearly added together. The composite compressed signal plus multipath interference signals would therefore automatically regenerate the original coded signal plus the multipath signal in a single code generator and provide cancellation of the composite interfering signal with a single amplitude adjustment.

Having thus shown and described what is at present considered to be the preferred embodiment of the invention, it should be understood that the same has been made by way of illustration and not of limitation and accordingly, all modifications, alterations and changes coming within the spirit and scope of the invention as defined in the following claims are herein meant to be included.

I claim:

1. A non-orthogonal code division multiple access communications system for a plurality of users, comprising:

a plurality of user communications apparatus, one for each user;

each said user apparatus including means for generating and transmitting a mutually different noise coded signal to another said user apparatus;

each said user apparatus further including, means for receiving a composite noise coded signal including a desired noise coded signal transmitted from a predetermined said user apparatus and any undesired interfering noise coded signal transmitted from at least one other said user apparatus, a plurality of noise code selective circuit means in separate signal paths for detecting said interfering noise coded signal included in said composite signal, respective circuit means coupled to said plurality of noise code selective circuit means for regenerating a replica of said interfering noise coded signal detected devoid of said desired noise coded signal, signal combiner means coupled to said composite signal received and said replica signals and being responsive thereto to operably cancel, by the process of subtraction, said interfering signal from said composite signal and leaving said desired signal, and detector means coupled to said signal combiner means for detecting said desired signal free of undesired interference.

2. The communications system as defined by claim 1 wherein said noise coded signal comprises a multi-bit digital spread spectrum code.

3. The communications system as defined by claim 2 wherein said noise coded signal of each said user apparatus comprises a mutually different digital noise code of the same number of bits.

4. The communications system as defined by claim 3 wherein each said plurality of noise code selective circuit means for detecting said interfering noise coded signal includes matched filter circuit means, said matched filter circuit means being operable to compress a predetermined one of a plurality of interfering noise coded signals, and wherein said respective circuit for regenerating a replica of said interfering noise coded signal comprises noise code generator means operable to coherently generate the same code compressed by the respective matched filter circuit means.

5. The communications system as defined by claim 4 wherein said signal combiner means comprises signal subtractor circuit means.

6. The communications system as defined by claim 5 and additionally including time delay circuit means coupling said composite signal to said signal subtractor circuit means for compensating for a delay introduced by said matched filter circuit means and said noise code generator means.

7. The communications system as defined by claim 6 and additionally including respective signal detector means coupled between each said matched filter circuit means and said noise code generator means.

8. The communications system as defined by claim 7 and additionally including signal amplifier means coupled between each said code noise generator means and said subtractor means to make the amplitude of each replicated interfering noise coded signal substantially equal to the amplitude of said interfering noise coded signal in said composite signal.

9. The communications system as defined by claim 3 wherein said plurality of noise code selective circuit means for detecting said interfering noise coded signal comprises a plurality of like circuits which are operable to detect selected ones of the different noise codes of said plurality of user apparatus.

10. The communications system as defined by claim 3 wherein said plurality of noise code selective circuit means for detecting said interfering noise coded signal comprises a plurality of like circuits which are operable to detect and regenerate substantially all of the different noise codes of said plurality of user apparatus.

11. The communications system as defined by claim 8 wherein said plurality of said like circuits is comprised of a bank of matched filters each operable to compress a predetermined interfering noise coded signal.

12. The communications system as defined by claim 11 and wherein said respective circuit means for regenerating a replica signal comprises noise code signal generator means operable to coherently generate the noise coded signal compressed by the respective said matched filter coupled thereto.

13. The communications system as defined by claim 12 wherein said signal combiner means comprises a plurality of intercoupled signal subtractors respectively coupled to said composite signal and to a mutually different replica noise coded signal whereby selective interference noise coded signal cancellation occurs in each signal subtractor.

14. The communications system as defined by claim 13 wherein said plurality of signal subtractors are coupled in a cascade circuit connection.

15. The communications system as defined by claim 14 and additionally including time delay circuit means coupling said composite signal to said cascade connected plurality of signal subtractors for compensating for a delay introduced by said bank of matched filters and the respective noise code signal generator means.

16. The communications system as defined by claim 15 and additionally including respective detector means interposed between each matched filter of said bank of matched filters and the respective noise code signal generator means coupled thereto and signal amplifier means coupled between each said noise code signal generator means and one respective signal subtractor of said plurality of signal subtractors, said signal amplifier means making the amplitude of the respective regenerated noise code substantially equal to the amplitude of the respective interfering noise coded signal in said composite signal.

17. The communications system as defined by claim 1 wherein said noise coded signal is comprised of a pair of multiplexed noise codes.

18. The communications system as defined by claim 17 wherein said pair of noise codes are of the type which compress to a lobeless impulse.

* * * * *